A. JOHNSTON.
Ruffling Attachment for Sewing-Machines.
No. 5,052. Reissued Sep. 10, 1872.
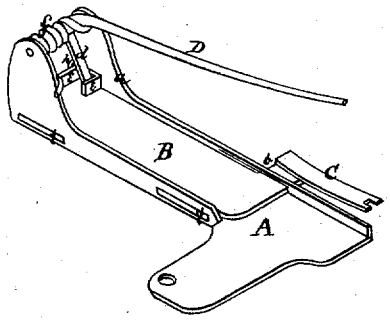
*Witnesses:*
Henry N. Miller
C. L. Evert.
*Inventor.*
Alex Johnston.
per Chandler Mason
*Attorneys.*
AM. PHOTO-LITHOGRAPHIC CO. N.Y. (OSBORNE'S PROCESS.)

UNITED STATES PATENT OFFICE.

ALLEN JOHNSTON, OF OTTUMWA, IOWA.

IMPROVEMENT IN RUFFLING ATTACHMENTS FOR SEWING-MACHINES.

Specification forming part of Letters Patent No. 108,486, dated October 18, 1870; reissue No. 5,052, dated September 10, 1872.

*To all whom it may concern:*

Be it known that I, ALLEN JOHNSTON, of Ottumwa, in the county of Wapello and in the State of Iowa, have invented certain new and useful Improvements in Ruffling and Plaiting Attachments for Sewing-Machines; and do hereby declare the following to be a full, clear, and exact description thereof, reference being had to the accompanying drawing and to the letters of reference marked thereon making a part of this specification.

The nature of my invention consists in the construction and arrangement of a "ruffling and plaiting attachment for sewing-machines," as will be hereinafter more fully set forth.

In order to enable others skilled in the art to which my invention appertains to make and use the same, I will now proceed to describe its construction and operation, referring to the annexed drawing, which represents a perspective view of my sewing-machine attachment.

A represents the bed-plate of my attachment, having its edges *a a* turned up to form guides, between which the sliding piece B moves. This slide has pins *i i* in its edges, which move in slots on the turned-up edges *a a* of the bed-plate. An arm, *b*, projects from one side of the slide B through a slot in the eye *a*, and to the outer end of this arm is attached a spring, C. This spring C has a slot in the end to pass the needle through. The point of the spring is so curved upward as to catch the upper piece of goods, gathering the same. At the rear end, on the upper side of the slide B, are upward-projecting flanges *e e*, between which is placed the lower end of an arm, *d*, projecting from a shaft or pivot having its bearings in the turned-up edges *a a* of the bed-plate A. Another longer arm, D, is attached to the same shaft or pivot, and its outer or front end is operated upon by the needle-bar. A spring, *f*, surrounds the said shaft or pivot, and bears against the under side of the arm D to raise the same up. The piece to be ruffled is placed above the spring C, while the other piece is placed underneath said spring. When the ruffler is attached to the machine the needle-bar carries down with it the bar D, which draws back the spring C, the goods being held by the presser-foot, and at the upward motion of the needle-bar the spring catches and ruffles it. The spring being turned up will more readily catch and move the goods forward. A screw, *h*, passing through the rear flange *e*, and bearing against the arm *d* on its rear side, regulates the movement of the slide B, and hence also the length of the gather.

Having thus fully described my invention, what I claim as new, and desire to secure by Letters Patent, is—

1. A frame, a reciprocating gathering plate or spring, and an elbow-lever, combined and operated by the needle-bar, and in connection with the presser-foot, to gather the fabric between it and the presser-foot.

2. The combination of the bed-plate A with its turned-up slotted edges *a a*, slide B, spring C, arms D *d*, spring *f*, and screw *h*, all constructed and arranged to operate as and for the purposes herein set forth.

In testimony that I claim the foregoing I have hereunto set my hand this 8th day of July, 1872.

ALLEN JOHNSTON.

Witnesses:
A. N. MARR,
C. L. EVERT.